H. P. MATTSON.
SAFETY BRIDLE.
APPLICATION FILED JULY 29, 1908.
910,703.
Patented Jan. 26, 1909.
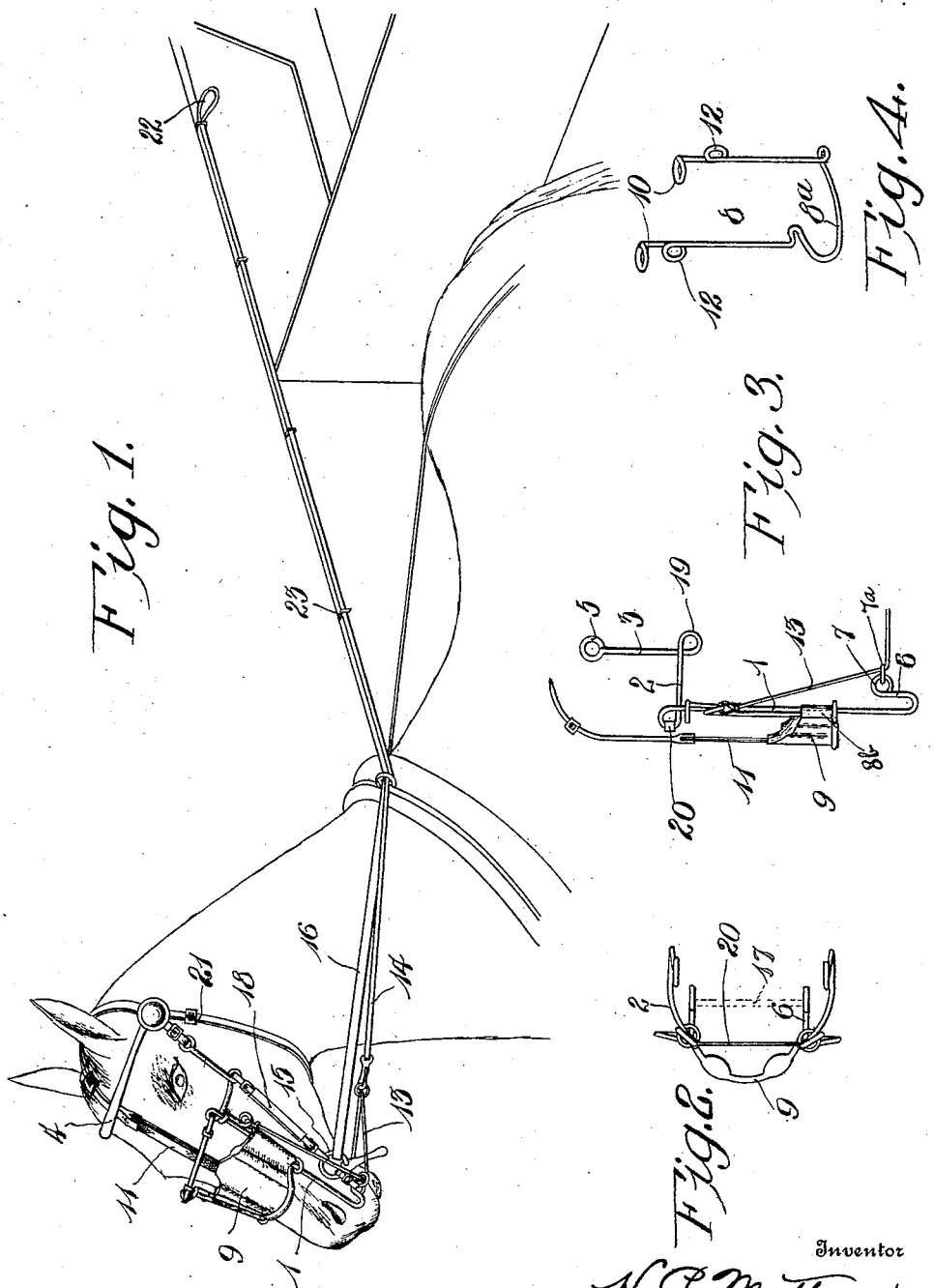
Witnesses
C. E. Smith.
S. E. Dodge.
Inventor
H. P. Mattson,
By Beeler & Robb
Attorneys

UNITED STATES PATENT OFFICE.

HANS P. MATTSON, OF ENGLEWOOD, NEW JERSEY.

SAFETY-BRIDLE.

No. 910,703.  Specification of Letters Patent.  Patented Jan. 26, 1909.

Application filed July 29, 1908. Serial No. 445,966.

*To all whom it may concern:*

Be it known that I, HANS P. MATTSON, a subject of the King of Sweden, residing at Englewood, in the county of Bergen and State of New Jersey, have invented certain new and useful Improvements in Safety-Bridles, of which the following is a specification.

This invention relates to harness and comprises a novel form of bridle the construction of which is particularly designed to enable a driver to control runaway horses.

The invention embodies improvements in that type of bridles which provide means for subduing intractable animals by employing means for strangling the animals in order to prevent them from running away.

For a full understanding of the invention, and the merits and advantages thereof, reference is to be had to the following detail description, and to the accompanying drawings, in which:

Figure 1 is a view showing the invention applied; Fig. 2 is a top plan view of the frame of the bridle; Fig. 3 is a side elevation, and Fig. 4 is a detail perspective view of the sliding frame.

Similar reference characters refer to similar parts throughout the description and drawings.

Specifically describing the construction of the invention, the numeral 1 designates the side bars of a rigid frame which forms the body of the bridle, said bars being bent laterally intermediate of their ends, as shown at 2, and thence extended upwardly as at 3. The extensions 3 may be connected by the brow-band 4 the ends of which are attached to loops 5 at the upper extremities of said extensions. The lower ends of the bars 1 are upturned as shown at 6 and formed with loops 7. Slidably mounted on the frame bars 1 is a frame 8 of somewhat U-form, the cross bar 8ª of said frame being curved and having secured thereto a nose pad 9. The pad 9 may be made of any suitable material and is covered preferably with leather, or the like, the opposite edges of the covering being secured about the bars 1 and the adjacent sides of the frame 8, as shown at 8ᵇ, thereby securing the pad to the parts 1 and 8 and slidably connecting said parts together at the lower end of the frame 8. The lower portion of the pad 9 is also connected with the cross bar 8ª of the frame 8 so that the pad and frame may move together when properly actuated by means to be described. Guide loops 10 formed at the upper extremities of the sides of the frame 8 receive the adjacent bars 1 of the main frame of the bridle and coöperate with the pad 9 to slidably connect the same with the bars 1.

It is contemplated that the pad 9 applied to the bars 1 shall be of a suitable size to readily cover the nose of the animal to which the bridle is applied, in order to close the nostrils of the animal whenever necessary, as when to control him should he become unmanageable. Normally, however, an elastic strap, or connection, 11, attached at its lower end to the pad 9 and secured to its upper end to the crown loop of the bridle, is adapted to hold the pad 9 above the nose of the animal so that it does not interfere with breathing through his nostrils.

Connected with loops 12 formed intermediate of the ends of the sides of the U-frame 8 is a strap 13 the middle portion of which is connected by a ring and snap hook with a pull-cord 14. The end portions of the strap 13 pass through rings 7ª connected to the loops 7 formed at the lower ends of the bars 1, and thence upwardly to the points of connection by means of suitable snap hooks with the loops 12 aforesaid. It will be apparent that when the cord 14 is pulled upon the frame 8 and the pad 9 will be drawn downwardly so as to cover the nose of the animal, and prevent him from breathing. Also secured to the loops 7 of the bars 1 are rings 15 with which the reins 16 are connected, and also the bit of the bridle, shown in dotted lines at 17. The rings 15 may also be connected by short straps 18 with loops 19 formed near the laterally bent portions 2 of the bars 1, making the connections between the parts of the bridle more substantial. For the same purpose a short transverse strap 20 is employed to connect the bars 1 and is attached thereto intermediate of the ends of the bars and at the outer extremities of the lateral portions 2 before described.

The usual throat strap 21 may be employed as a part of the bridle.

For convenience in manipulating the same, it is preferred that the pull-cord 14 be connected with one of the reins 16 and operable by a hand grip 22 located adjacent to the driving ends of said reins. With the above in view one of the reins 16 is provided at intervals in its length with small loops 23 through which the pull-cord passes. Should the animal become unmanageable at any time it will be apparent that it is only necessary for the driver to grasp the grip 22 of the pull-cord 14 and by pulling upon the same the nose pad 9 will be lowered to cover the nose of the animal against the tension of the elastic connection 11. By partially strangling the animal it will be apparent that he may be readily subdued or rendered tractable.

The bridle comprising the present invention may be used in connection with an ordinary bridle, or certain parts thereof, or it may be used alone in the manner in which it is illustrated in the drawings. The nose pad 9 is preferably composed of a body of horse hair stuffed into a covering of leather.

Having thus described the invention, what is claimed as new, is:

1. A bridle comprising a main frame consisting of side bars and attaching means therefor, a frame slidable longitudinally upon the main frame, a nose pad carried by the slidable frame, an elastic member connected with the nose pad and normally holding the same in a predetermined position, and a pull-cord connected with the upper portion of the slidable frame for moving the nose pad and slidable frame against the tension of the elastic means aforesaid.

2. A bridle comprising a rigid frame, a crown loop connected thereto, an auxiliary rigid frame embodying spaced sides formed with guide loops at the upper and lower ends thereof, said guide loops receiving the side portions of the main frame and permitting sliding movement of the auxiliary frame thereon, a nose pad having its opposite side edges attached to the opposite sides of the auxiliary frame aforesaid, an elastic member connecting the upper member of the nose pad with the crown loop and normally tending to hold said nose pad above the nose of the animal, the lower end of the main frame having loops at opposite sides thereof, and a strap having sliding connection with the loops last mentioned and being connected with opposite side portions of the auxiliary frame so as to enable the latter to be pulled downwardly in imparting such movement to the nose pad and against the tension of the flexible member before referred to.

3. A bridle comprising a main frame composed of spaced side bars and connections therebetween, the lower ends of said bars being formed with guide loops, a frame slidably mounted on said bars and comprising spaced sides, a nose pad connected at its opposite edges with said frame, an elastic connection attached to the nose pad for holding the same and its supporting frame normally at the upper limit of movement thereof, a pull-cord, and a strap connected with the pull-cord and with its end portions having sliding connection with the guide loops of the bars aforesaid and connected with the sliding frame for actuating the same and the nose pad.

In testimony whereof I affix my signature in presence of two witnesses.

HANS P. MATTSON.

Witnesses:
 CHAS. REID,
 ANNA E. CHRISTIE.